United States Patent [19]

Cunningham et al.

[11] Patent Number: 5,737,605
[45] Date of Patent: Apr. 7, 1998

[54] DATA PROCESSING SYSTEM FOR SHARING INSTANCES OF OBJECTS WITH MULTIPLE PROCESSES

[75] Inventors: Connel G. Cunningham, Co. Dublin; Ferghil J. O'Rourke, Dublin, both of Ireland

[73] Assignee: International Business Machines Corporation, Armonk, N.Y.

[21] Appl. No.: 729,829

[22] Filed: Oct. 8, 1996

Related U.S. Application Data

[63] Continuation of Ser. No. 311,085, Sep. 23, 1994, abandoned.

[30] Foreign Application Priority Data

Oct. 12, 1993 [GB] United Kingdom ............... 9320982

[51] Int. Cl.[6] ........................................................ G06F 9/40
[52] U.S. Cl. .......................... 395/670; 395/683; 395/685; 395/474
[58] Field of Search ............................... 395/670, 615, 395/613, 683, 685, 474

[56] References Cited

U.S. PATENT DOCUMENTS

| 4,754,394 | 6/1988 | Brantley | 364/200 |
|---|---|---|---|
| 5,047,925 | 9/1991 | Kun | 364/200 |
| 5,357,612 | 10/1994 | Alaiwan | 395/200 |
| 5,374,932 | 12/1994 | Wyschogrod | 342/36 |
| 5,396,614 | 3/1995 | Khalidi | 395/425 |
| 5,404,521 | 4/1995 | Murray | 395/650 |

OTHER PUBLICATIONS

"OS/2 2.0 Control Program Programming Guide", IBM OS/2 Technical Library, Mar. 1992, ISBN: 1-56529-154-9, Que, USA, 36 pages.

"Instantiation of C++ Objects in Shared Memory", Journal of Object Oriented Programming, vol. 4, No. 1, Mar. 1991, D. Jordan, pp. 21-28.

"Doss: A Storage System for Design Data", S. Weiss et al, 23rd ACM/IEEE Design Automation Conference Proc., Jun. 29, 1986, pp. 41-47.

*Primary Examiner*—Lucien U. Toplu
*Attorney, Agent, or Firm*—Diana L. Roberts

[57] ABSTRACT

The present invention provides a computer system and method of controlling such a system, where the system includes an operating system and memory controlled by the operating system. An allocation means is provided which is accessible by a first process and is used to create an object in a first portion of the memory. The system is characterized by a means for designating the first portion of memory as memory to be shared between a plurality of processes and an identification means for indicating to a second process the location of the object in the first portion of memory. Using this technique, instances of objects can be shared between a plurality of processes.

2 Claims, 4 Drawing Sheets

Process A obj     * x = new obj;
    --
    --
    x → setSomeData (___);
    --
    x → send (   );

Process Boundary

X ptr

Process B obj     * x = DosReadQueue (___);

x → ReadSomeData (   );

// Data READS OK
    // FROM OBJECT

DATA PROCESSING SYSTEM FOR SHARING INSTANCES OF OBJECTS WITH MULTIPLE PROCESSES

This is a continuation of application Ser. No. 08/311,085 filed Sep. 23, 1994, now abandoned.

BACKGROUND OF THE INVENTION

1. Field of the Invention

The present invention relates to a data processing system having a message based environment in which 'objects' are created and utilized by processes running on the system.

2. Background Discussion and Description of the Related Art

A message based environment is used by Object Oriented Programming (OOP) techniques, OOP being a particular approach to software development which implements required functions by way of 'messages' sent to 'objects'. An 'object' is a software component that contains a collection of related procedures (hereafter called 'methods') and data. Further objects can be grouped into 'Object Classes', an object class being a template for defining the methods and data for a particular type of object. All objects of a given class are identical in form and behavior but have different data associated therewith.

A 'message' is a signal sent to an object to request the object to carry out one of its methods. Hence a message sent to an object will cause a method to be invoked to implement the required function.

When a process is running on a data processing system, there may be a requirement at some stage for an 'instance' of an object to be created for future use by the process. Typically the OOP environment in which the process is running will have a standard operator defined for creating instances of an object, and this operator would be expressed as part of the process to indicate that the process requires a particular object to be created. At the time that the process was initialized (or at some other convenient time before an instance of an object is created) the OOP environment would have obtained a block of memory from the operating system of the data processing system for use by the process. Hence the new object will be created in that piece of memory.

Since the piece of memory would generally be private to the process for which it was obtained, the object instance created in that memory will also be private to the particular process. However, with the increase in complexity of applications written in OOP languages, it is desirable for instances of objects to be accessible by processes other than the process which has created that instance.

Techniques are known for designating portions of memory as shared memory, in which a plurality of processes can share data stored in that portion of memory. However, these techniques do not allow instances of objects, (which consist not only of data but also methods) to be shared between processes. Therefore, there is a great desire for a process to have access to the methods of an object instance that was not created by that process.

SUMMARY OF THE INVENTION

It is an object of the present invention to provide a data processing system wherein objects created by a first process are accessible to one or more other processes.

Accordingly, the present invention provides a data processing system that includes an operating system memory controlled by the operating system, a first process having a first portion of the memory associated therewith, and an allocation process accessible by the first process for creating an object in the first portion of memory. The system is characterized by a designation process for designating the first portion of memory as memory to be shared between a plurality of processes, and an identification process to indicate to a second process the location of the object in the first portion of memory.

In preferred embodiments, the designation process is activated by the first process when the first process is initialized. However, an alternative would be to operate the designation process at some other time before an object is to be allocated in a shared portion of memory.

The designation process can either specifically identify the plurality of processes that are to be authorized to access the first portion of memory (eg the first and the second process), or alternatively, if security is not an issue, the designation process can just indicate that the portion of memory is to be made available to any process that can identify that portion of memory.

The identification process can indicate to the second process the location of the object in a variety of ways, e.g., by using one of a number of possible IPC mechanisms. In the preferred embodiment, the identification process indicates the location of the object by placing a pointer to that object in an input queue defined by the second process. With this technique, it is possible to stack up a number of objects on the queue for subsequent receipt and running by the second process.

The second process may be resident on the same data processing system as the first process, but alternatively it could be resident on another system connected via a network with the data processing system of the present invention.

The first and second processes may perform any numerous functions, and may be client/server type processes, or alternatively similar processes that need to share information. In the preferred embodiment, the second process is a database server process for administering requests to a database, and the first process is a client process of the second process. In this arrangement, the object created by the allocation process is the request for the database.

In preferred embodiments, a memory obtaining process is provided to obtain the first portion of memory from the operating system for use by the plurality of processes. This may be invoked as a separate method or alternatively can be included as part of a method carrying out this function in addition to the function of designating the memory as shared memory.

Viewed from a second aspect, the present invention provides a method of operating a data processing system that includes an operating system, memory controlled by the operating system, and a first process having a first portion of the memory associated therewith. The method steps of invoking an allocation process in response to the first process and creating an object in the first portion of memory. The method is characterized by the steps of: operating a designation process to designate the first portion of memory as memory to be shared between a plurality of processes, and in response to the first process, employing an identification process to indicate to a second process the location of the object in the first portion of memory.

The present invention will be described further, by way of example only, with reference to an embodiment thereof as illustrated in the accompanying drawings.

DETAILED DESCRIPTION OF THE PREFERRED EMBODIMENT

The preferred embodiment, includes a data processing system having the IBM OS/2 (IBM and OS/2 are trademarks of International Business Machines Corporation) operating system. The OOP environment consists of all the elements necessary to develop OOP applications. In the preferred embodiment, it includes the IBM OS/2 V2.1 operating system, the IBM OS/2 Development Toolkit V2.1, and the IBM C++ Compiler CSet/2. Further, the data processing system includes the IBM DB2/2 database software (DB2/2 is a trademark of International Business Machines Corporation). This environment enables C++ applications to be written.

One C++ application is a client/server application. This application includes a number of processes which need to interact. For example, there may be a process 'B' established to administer 'requests' to a database. Generally it is desirable, for reasons of robustness and performance, to perform lengthy operations, such as database access, in a separate process. Another process 'A' may act as a client of process 'B' because it may require the services of process 'B' in order to extract data from the database for its subsequent use.

The 'requests' that are packaged and sent by process 'B' to be serviced by the database are C++ objects, which will hereafter be referred to as "Request Objects". Several request objects can be defined, each one being capable of performing one particular database transaction. Process A may create a request object and then make it available to process B using the technique of this preferred embodiment (described herein).

Figure 1:
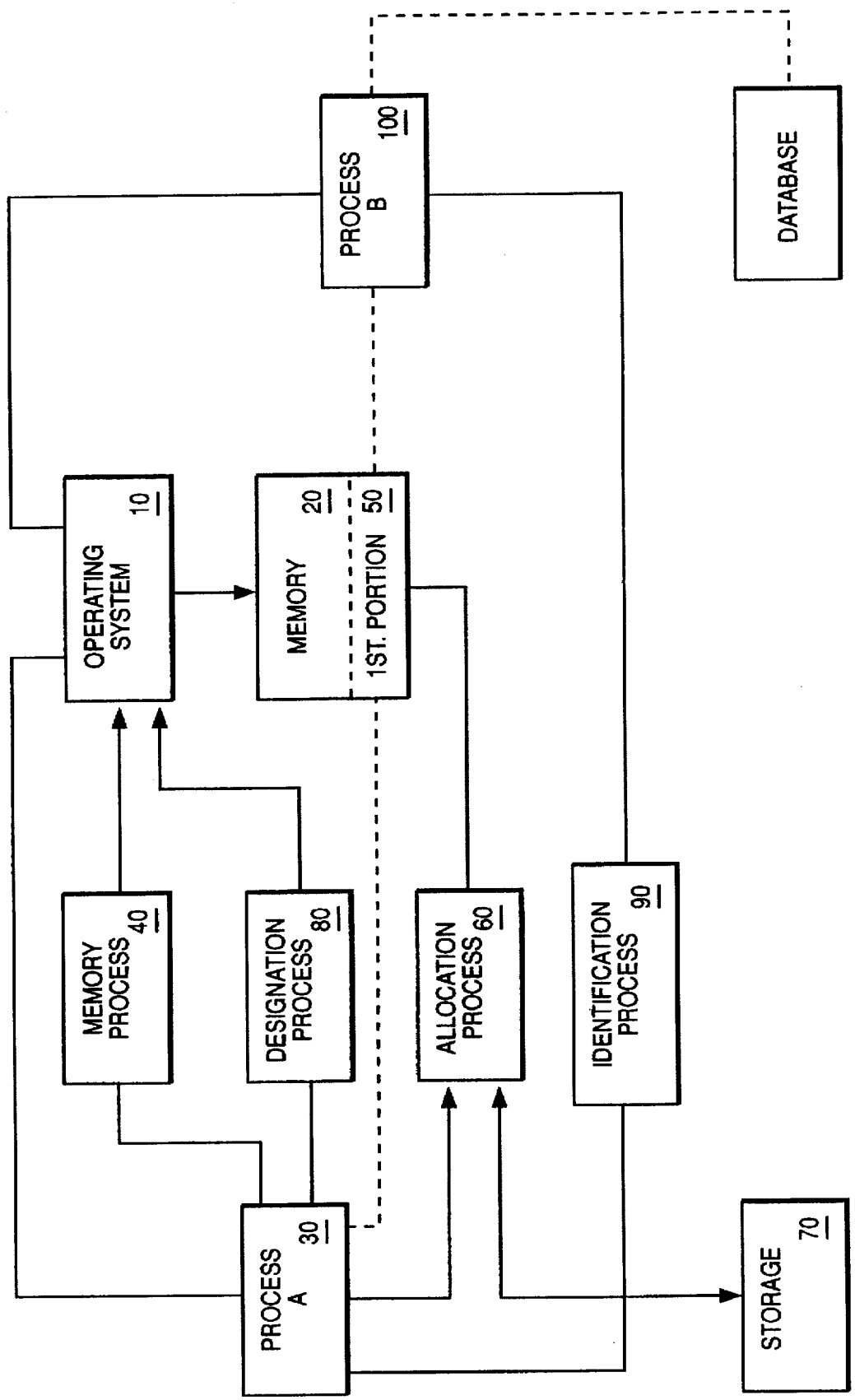
FIG. 1 is a block diagram illustrating the data processing system of the preferred embodiment.
Figure 4:
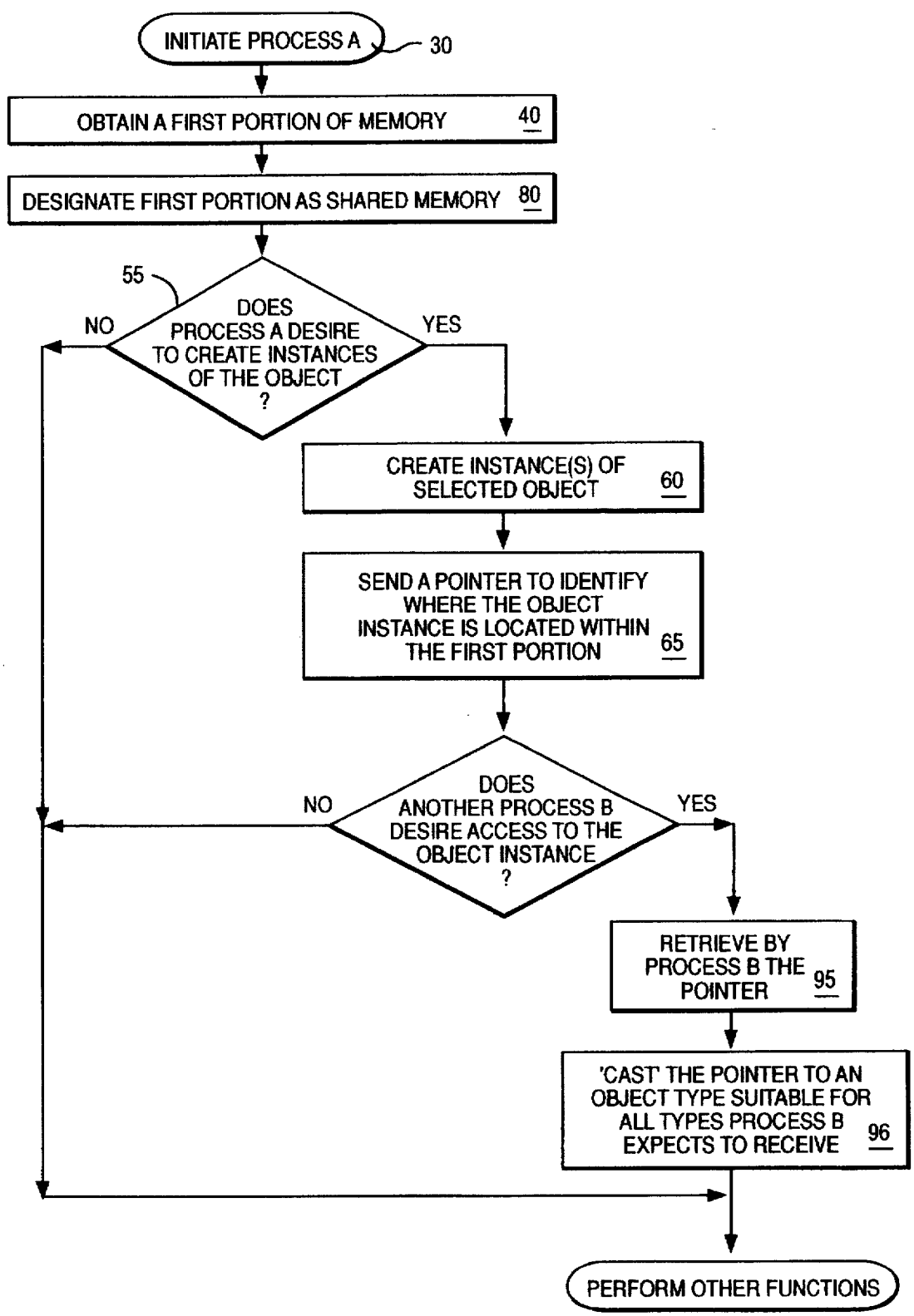
FIG. 4 is a flowchart of the process steps according to the preferred embodiment.

The technique by which a particular request object is created by process A and then made available to process B will now be discussed with reference to FIGS. 1 and 4. FIG. 1 is a block diagram of the data processing system of the preferred embodiment. The data processing system includes an operating system 10, such as the IBM OS/2 operating system which, among other things, has control of local memory 20. FIG. 4 is a flowchart of detailed logic illustrating the technique.

Referring to FIGS. 1 and 4, process A is initialized at 30. Process A instructs memory obtaining process 40 to obtain from operating system 10 a first portion 50 of memory 20 for use by process A. The designation process 80 designates the first portion 50 of memory 20 as memory to be shared between a plurality of processes. To do this, designation process 80 informs operating system 10 that a process or processes other than process A require read/write access to the first portion 50 of memory 20. The other processes may be specifically identified to the operating system by the designation process or, alternatively, if security is not an issue, designation process 80 indicates that portion of memory 20 can be made available to any process that can identify that portion of memory.

Memory obtaining process 40 and designation process 80 are actually implemented as methods of a special object, hereafter called a "Shared Allocator Object". The Shared Allocator Object replaces the standard C++ code used to create new instances of objects (commonly referred to as the 'NEW' operator). It also carries out the functions of creating and managing shared portions of memory and of allocating new instances of objects in the shared portion of memory. The Shared Allocator object will be described in more detail later. In the preferred embodiment, security is not an issue and, therefore, portion 50 of memory is to be shared by unspecified processes. Further a process B knows the location of portion 50. Because any process can access portion 50 of memory 20, process B need not approach the Shared Allocator object (as manager of the shared portion of memory) to request access to the shared memory. Instead, process B can access memory portion 50 directly.

Once the shared portion 50 of memory has been established by memory obtaining process 40, process A 30 can create instances of objects in that memory at 55. To do so, allocation process 60 creates an instance from a particular class specified by process A. Allocation process 60 is another method of the Shared Allocator object that accesses storage 70 to obtain details of the object class from which a particular instance is to be created.

In our preferred embodiment, the methods for particular objects are stored in code libraries, which in the OS/2 environment are referred to as Dynamic Link Libraries (DLL). Typically, these libraries will be resident in storage 70 of the data processing system. When the C++ runtime system (forming part of the compiler) creates an instance of an object in portion 50, it does so by establishing a table of pointers, each pointer pointing to a method in the code library, and then adding a block of data to be associated with that table. When a method is subsequently to be carried out, the pointer can be used to extract the relevant code from the code library and then execute the code using the data as appropriate. The table mentioned above that contains a list of code pointers to the methods of a particular object is referred to as a "Virtual Function Table" (vft). Each object instance can be considered a Vft and data. As such, at 65, when an object instance is created by a process, its vft is created with pointers that point to methods that reside in the DLL.

The DLLs are constructed as runtime libraries. As such, other executables or DLLs can load code from a DLL on demand. By locating the methods for objects in these DLLs, they can be shared by a number of concurrently executing programs (processes). However, each process must recognize which methods to execute from DLL whenever it receives an object from another process.

For example, if a second process receives access to an object created by process A, it must be able to reference the code (methods) pointed to by the Vft if it is to make use of that object. To do so, once allocation process 60 has created a new instance of an object in shared memory portion 50, process A places necessary data in that object instance. This having been done, process A may then require that the instance be available to process B. Process B may, for example, be the database server process mentioned earlier and the instance created by process A may be a request object. Process B is capable of obtaining access to the shared memory portion 50 because, as mentioned earlier, it knows the location of the memory portion and process A has not restricted access. However, process B now needs to know where the object instance in question is located within that memory if it is to make use of that instance.

Process A provides this information by way of a 'pointer' sent by identification process 90 using an appropriate IPC mechanism. In the preferred embodiment process B defines an input queue and waits for requests on that queue. At 65, the object pointer is then sent by identification process 90 to that queue, where its presence is brought to the attention of process B by the operating system. By using a queue several object pointers can be 'stacked up' on the queue as a queue of requests for the server process B.

Once the operating system has informed process B of the presence of a pointer on the queue, process B reads the pointer from the queue, which then enables it to access the object instance (vft plus data) in the shared memory. Once process B has linked in the appropriate DLL containing the methods of this object instance, process B is then in a position to utilize the object.

When process B initializes itself, it loads in the DLL containing the code and vfts for all objects it intends to use (eg. receive on the queue). Although this need not necessarily happen at initialization, it will need to occur before process B is in a position to utilize any object instance indicated via a pointer on the queue. In the OS/2 environment, the simplest way to load in the above-mentioned DLL is to use a function call named 'DosLoadModule'. The DosLoadModule call is a type of function call that loads a particular load module (DLL) into a program so that that program can use any of the functions in that module. Similar function calls will be available in other environments.

When process B receives a pointer to an object from process A (via the IPC), at 96, process B must 'cast' the pointer to an object type suitable for all object types it expects to receive. For instance, the database server process B will expect all objects received to be request objects, such objects having the common feature (as discussed later) of containing a RUN method that is invoked by process B. Process B performs this 'casting' by using any general parent class (eg. in the preferred embodiment it will use the general Request object class).

When a message is sent to the shared object instance, the OOP environment (eg. C++) immediately attempts to resolve this message into a method through the Vft of the object stored in shared memory portion 50. It will be able to resolve this message because the DLL where the code for the method resides will already have been loaded earlier by process B (e.g., via a DosLoadModule call).

When the shared object is a Request object, the database server process B invokes a 'Run' method in the Request object, regardless of the actual request, and the Request object will then take over. The Request object will, for instance, access the database and extract the required data, but within the database server process B. Once the required data has been retrieved from the database, the request object stores it in the shared memory, opens a return queue to the client process A, and returns pointers to that data.

The above technique has the following advantages. By using memory containing function pointers (in the vft) to address code residing in DLLs, it has been found that any secondary process can load code from the DLL. Further, by loading the code from the DLL in the secondary process, that process can 'run' any method of any object in that DLL, given a valid vft.

The Shared Allocator that performs the functions of creating and managing shared portions of memory and of allocating new instances of objects in the shared portion of memory will now be discussed in more detail. C++ provides two standard operators to handle the dynamic creation and deletion of objects. These operators are referred to as NEW and DELETE and similar operators exists in other OOP environments. In the preferred embodiment, these two operators have been replaced with a new C++ object class, referred to as the Shared Allocator Class. Any object allocated from such a Class will supply the following 5 methods.

1. Constructor

This special process is implemented once when the Shared Allocator object is first created. This process directs the Operating System to allocate a block (portion) of memory and makes this block shareable among other processes. With reference to FIG. 1, this process is implemented by memory obtaining process 40 and designation process 80.

It also directs the Operating System to prepare the memory block for use as a heap. This process ensures that many individual pieces of memory can be "Sub-Allocated" from within this memory block.

2. AllocMemory

This process is implemented when a piece of memory is to be allocated. This would normally be as a result of a NEW call in C++ programs and is represented in FIG. 1 by allocation process 60.

This process determines whether Shared Memory is in use within a process. (Each process using the Shared Allocator object has its own flag indicating this state.)

If Shared Memory is in use, (i.e., the client process A had called the UseSharedMemory method described below) then the space required is allocated from the Shared Memory heap managed by the Shared Allocator object. This is also done by a call to the Operating System.

If Shared Memory is not in use, then the normal C++ method of allocating (non-shared) memory is used (called 'MALLOC' in OS/2).

3. FreeMemory

This process is implemented when a piece of memory is to be freed. This would normally be as a result of a DELETE call in C++ programs.

This process determines whether the block of memory has been allocated from the Shared Heap. (The start address and size of the Shared Heap are kept as instance data in the Shared Allocator object).

If the memory block was allocated on the Shared Heap, then the appropriate Operating System call is made to return this block to the Heap.

If the block was not allocated from the Shared Heap, then the normal C++ method of freeing (non-shared) memory is used (called FREE in OS/2).

4. UseSharedMemory

This process simply sets a flag for the calling process which indicates that any future allocation calls from that (client) process should use the Shared Heap.

5. Destructor

This process is implemented when the Shared Allocator object is about to be destroyed, for example, at the end of a program. It once again calls the Operating System to free up the block of Shared Memory which it had been managing.

Now, all that is necessary is to declare a single Global Shared Allocator object and use standard C++ Syntax to replace the standard NEW and DELETE operators. NEW should be made to call the AllocMemory method and DELETE to call the FreeMemory method.

The object code for the above described methods should then be added to the C++ runtime library, replacing the old NEW and DELETE code. The method for doing this is compiler dependant, but will be apparent to the person skilled in the art.

Figure 2:
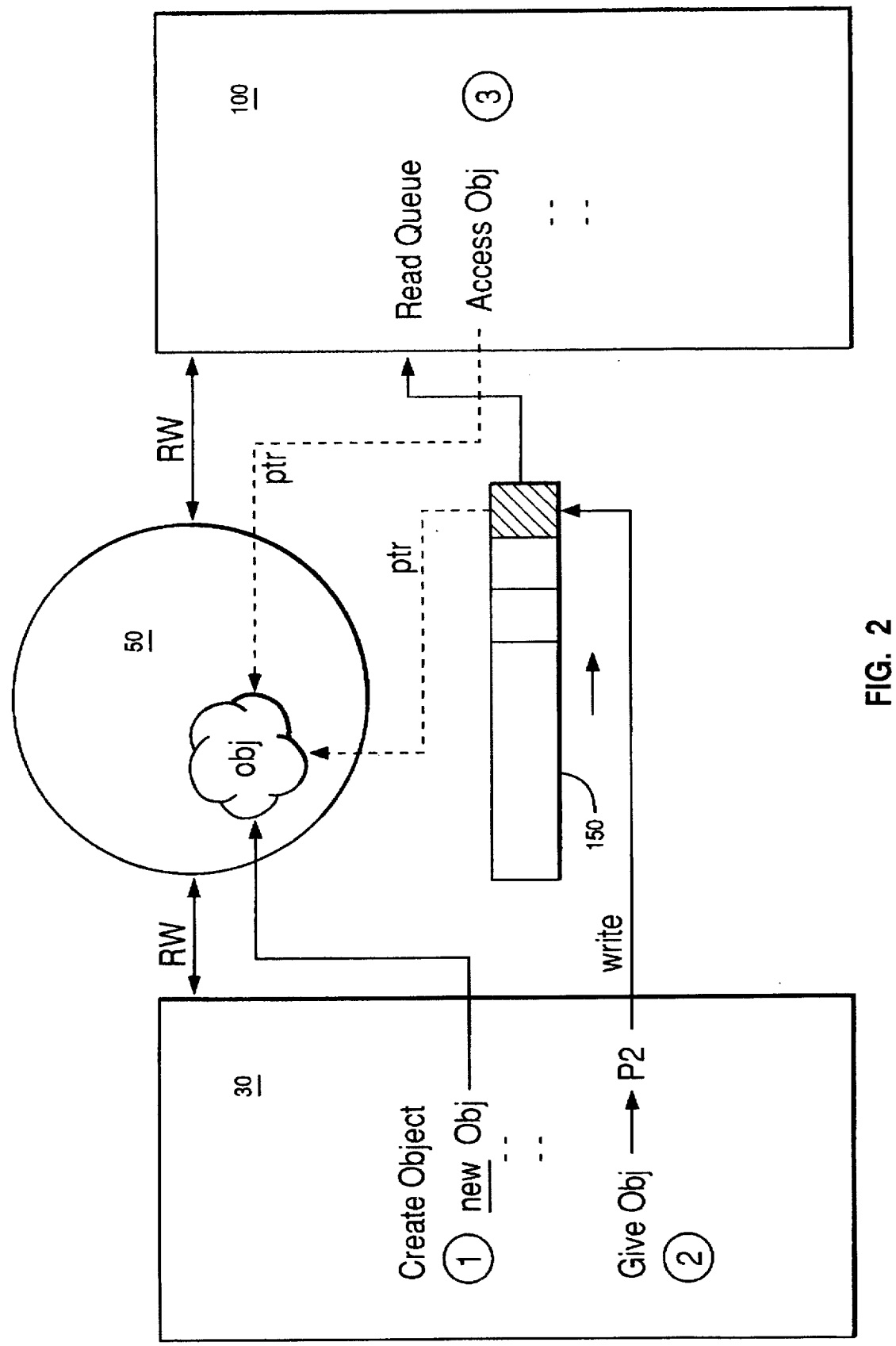
FIG. 2 illustrates the technique of the preferred embodiment.

To further illustrate the operation of the preferred embodiment, consider the diagram of FIG. 2. When process A 30 is initialized, it calls the Shared Allocator object to obtain a base heap of memory 50 to be used as shared memory. The process of the Shared Allocator object that performs this function is the 'Constructor' process described earlier. After the constructor process has completed, there will be a base heap of memory 50 (i.e. memory portion) for which a plurality of processes (specifically identified or unspecified depending on security requirements) have been allowed read/write access. In FIG. 2, process A 30 and process B 100 are shown having read/write access to the shared heap 50.

Process A then uses the 'new' operator at step 1 of the process to invoke the AllocMemory process of the Shared Allocator object to create an object instance and allocate it on the base heap 50. As mentioned earlier, the standard new operator has been overridden so that using the 'new' operator now directly invokes the AllocMemory process. Having allocated the object instance, process A can then fill it with data.

At step 2 of Process A, identification process 90 send a pointer to a queue 150. As mentioned earlier, several such objects can be stacked on the queue. The operating system informs process B of the presence of an object pointer on queue 150 and then process B 100 retrieves that pointer. Using the pointer, process B can then access the object in shared heap 50 and retrieve the data and vft. Because the DLL containing the methods for that object has already have been loaded by process B, process B can use the vft to invoke the 'run' method for that object. Having been done, the object performs a set task, such as retrieving data from a database, storing that data in the shared heap, and sending a pointer back to process A to indicate where that retrieved data has been stored.

Figure 3:
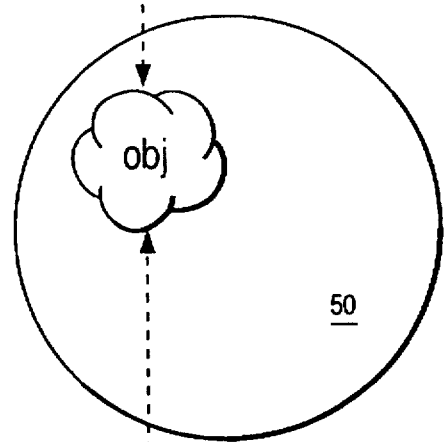
FIG. 3 further illustrates the technique shown in FIG. 2.

FIG. 3 further illustrates the technique shown in FIG. 2. Process A creates an instance of an object with a pointer 'x' pointing to it. This instance is then filled with data and the pointer x sent to a queue 150. On the other side of the process boundary, process B reads the pointer x using the OS/2 command "DosReadQueue". Then-the vft and data in the shared memory heap 50 are automatically read using the pointer 'x'.

In the preferred embodiment, each Request object is responsible for performing one particular Database transaction. To do so, each object implements a method called 'run()'. This method title is never changed and is only invoked by the server process B. A class hierarchy of request objects is created, an example being as follows:

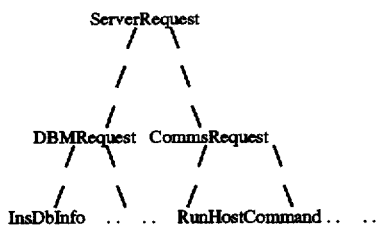

As an example consider the following C++ class definition:

```
class __Export InsDbInfoReq : public DBMRequest
{
public:
/* --------------- Construction/Destructor --------------
    InsDbInfoReq - Just directs straight up to the parent class and
                   assigns parameter data for request function
                                                              */
    InsDbInfoReq ( DbInfo* dbData )
        : DXTDBMRequest ( )
    {
        IkeyData = dbData;
    }
/* ------------------ Implementors ----------------------
    run - Calls the DBR_C_DBINFO to insert a row into the DB
          and uses key data passed in when object was created
                                                              */
    unsigned short run ( ) { DBR_C_DBINFO( IKeyData ); }
private:
DbInfo* IKeyData;
};
```

The first line of the definition identifies a class that is to be called InsDbInfoReq and is to be inherited from the class DBMRequest. The "$_{13}$Export" qualifier signifies that something (eg. another DLL) external to the DLL (in which the methods for this class are to be stored) will run the class. The word "public" appearing on the next line indicates that everything to follow is to be available to objects other than that be being defined (i.e. InsDbInfoReq). The next line of code sets up a pointer 'dbData' to a data structure of the type 'DbInfo'. Next, after the colon, the term 'DXTDBMRequest ()' represents call to the constructor process of the parent class DBMRequest.

The next line sets the instance data IkeyData equal to the pointer dbData. The next line defines a 'run' method of the type 'unsigned short'. The function to be called is $DBR_{13}C_{13}DBINFO$. The last two lines define a piece of information that is private to the object class, namely a pointer IKeyData pointing to a data structure of the type DbInfo.

Having defined the class InsDbInfo consider the following sample piece of code:

| Process A | Process B |
|---|---|
| DbInfo* info = new DbInfo | |
| info->name = "newDataRow" | |
| info->date = "010193" | |
| info->time = "13:15:09" | |
| // create object on heap | |
| InsDbInfoReq* x = new | |
|    InsDbInfoReq( info ); | |
| // Hierarchy implements send method | // Process B receives ptr to |
| // which sends ptr to specific process | // object and casts it to a |
|  | // general DBM request |
| x->send(); | DosReadQueue( &ptr ); |
|  | request = (DBMRequest *) ptr; |
|  | // Run the request |
|  | request->run(); |

The first four lines in process A handle the setting up of a pointer to a DbInfo structure called 'Info', and the placing of certain information (name, date time) in that data structure. Then, an instance of the object class InsDbInfoReq is created with a pointer 'x' pointing to it. This instance has data contained in the data structure called 'Info'. The 'send' method (resident in a parent class) is then invoked to send the object pointer 'x' to process B. Process B receives this pointer and casts it to the general class DBMRequest. This occurs automatically, having already been decided that process B is to expect objects of the type DBMRequest from process A. Next the 'run' method of this request object is executed, resulting in the request being processed and the desired information returned to process A.

We claim:

1. A computer system having a message based environment, whereby objects comprise one or more methods and associated data, and the methods are invoked by messages, the computer system comprising:

an operating system;

memory controlled by said operating system;

means for initiating a first process having a first portion of said memory associated therewith;

allocation means, accessible by said first process, for creating at least one object in said first portion of said memory;

designation means for designating said first portion of said memory to be shared with at least a second process;

a storage device containing a code library for storing the methods of said object, said code library being accessible by both said first process and said second process;

said allocation means for creating a table of pointers and said associated data for said object in said first portion of said memory, each pointer pointing to a method in said code library required by said object; and identification means for indicating to said second process the location of said object in said first portion of said memory, said identification means for providing said second process with an object pointer identifying the location of said object within said first portion of memory, said second process utilizing said object pointer to access said object, and to utilize said object by employing the methods referenced by the table of pointers in said first portion.

2. A method of controlling a computer system having a message based environment, whereby objects comprise one or more methods and associated data, and the methods are invoked by messages, and having at least an operating system and memory controlled by said operating system, said method comprising the computer-implemented steps of:

initiating a first process having a first portion of said memory associated therewith;

creating at least one object in the first portion of said memory, said object being accessible by said first process;

designating said first portion as being shared memory with at least a second process;

storing the methods of said object in a code library, said code library being accessible by both said first process and said second process;

creating a table of pointers and said associated data for said object in said first portion of said memory, each pointer pointing to a method in said code library required by said object; and indicating to said second process the location of said object in said first portion by providing said second process with an object pointer identifying the location of said object within said first portion of memory, said second process utilizing said object pointer to access said object, and to utilize said object by employing the methods referenced by the table of pointers.

* * * * *